April 25, 1950 L. DEBUIT 2,505,464
BICYCLE OR MOTORCYCLE CARRYING A SINGLE STEERING WHEEL
AND TRANSMISSION GEARS AND CONNECTIONS THEREFOR
Filed Feb. 1, 1947 5 Sheets-Sheet 1

Inventor:
Louis Debuit

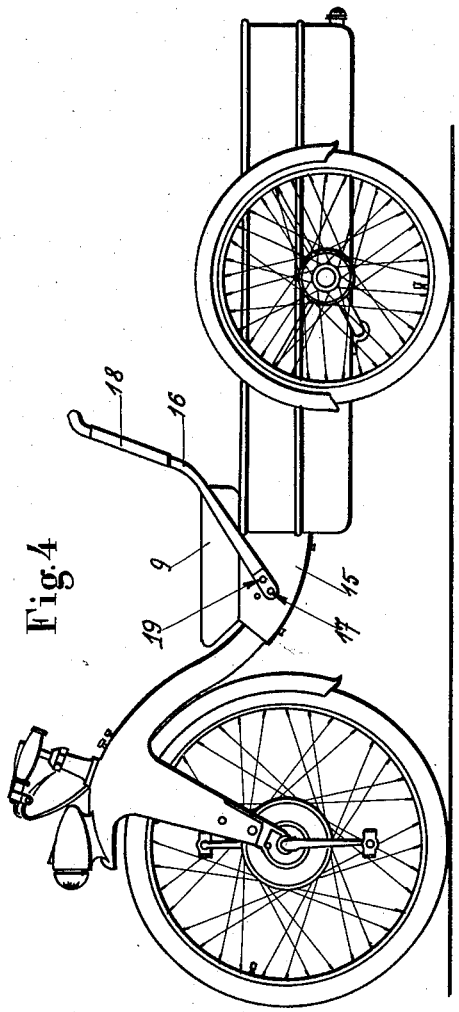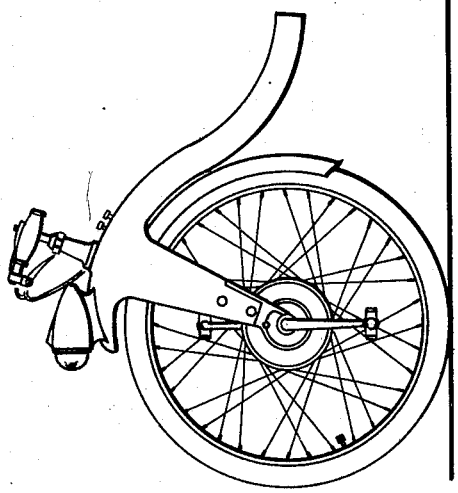

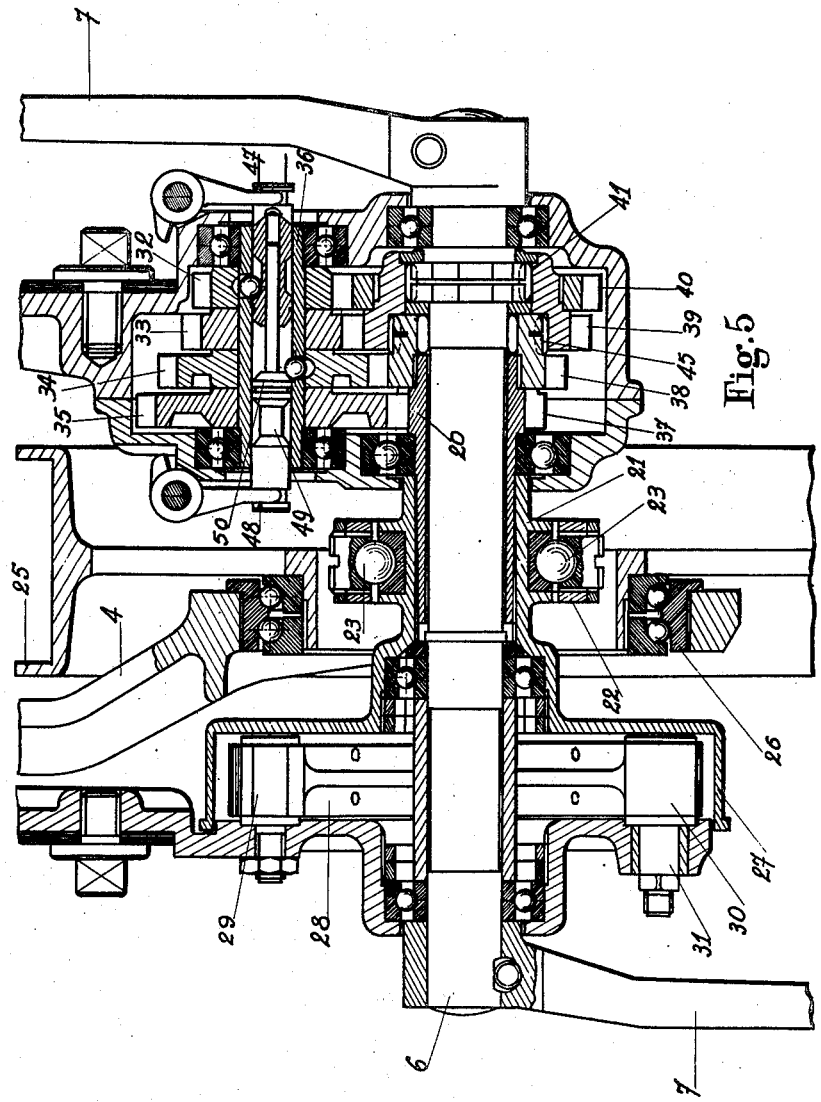

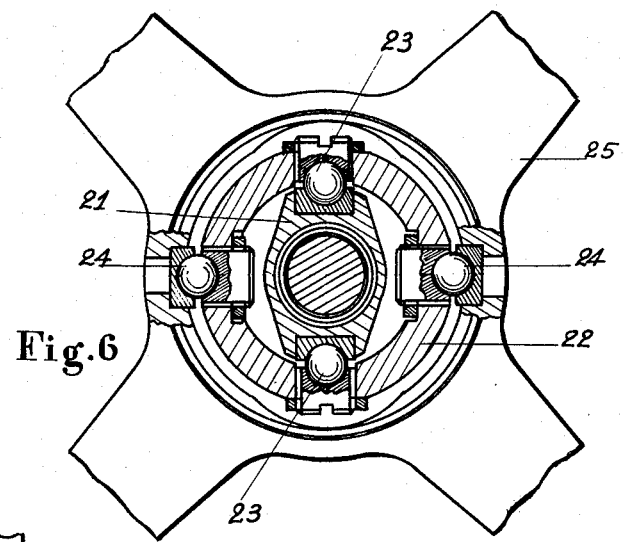
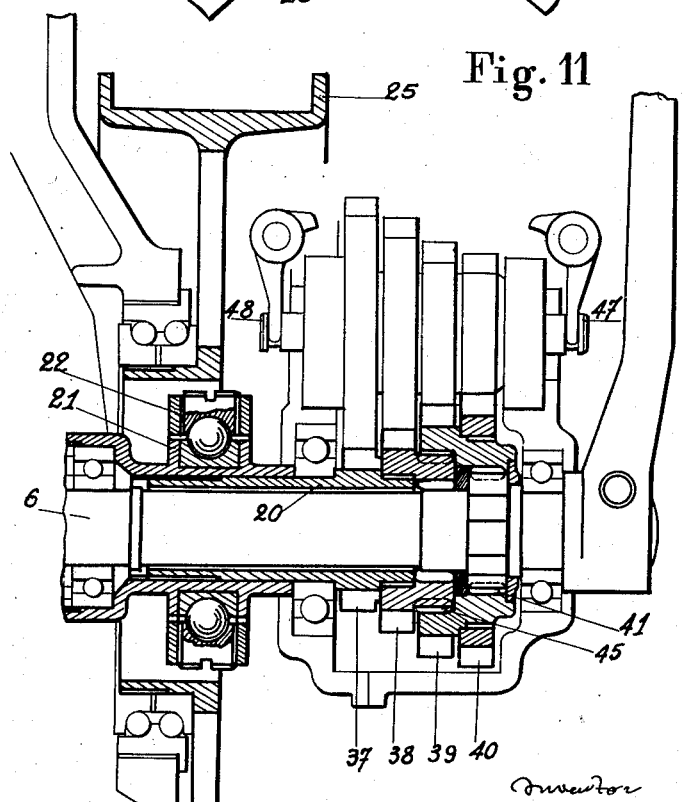

April 25, 1950 L. DEBUIT 2,505,464
BICYCLE OR MOTORCYCLE CARRYING A SINGLE STEERING WHEEL
AND TRANSMISSION GEARS AND CONNECTIONS THEREFOR
Filed Feb. 1, 1947 5 Sheets-Sheet 5
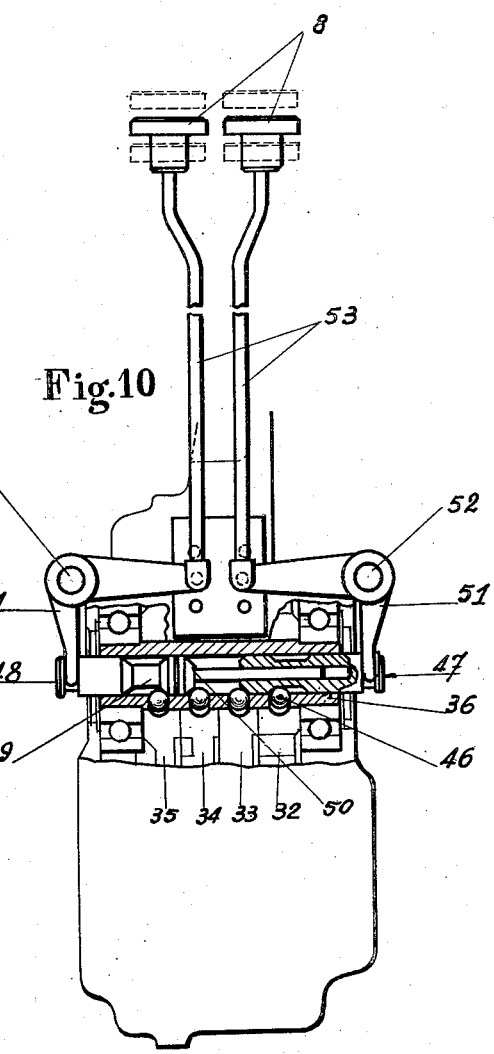
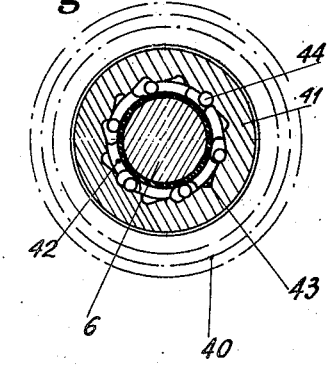
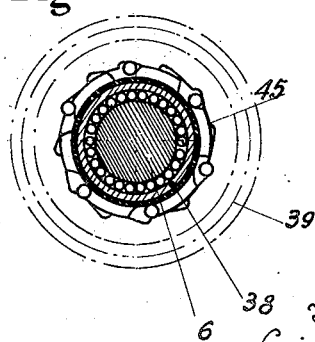
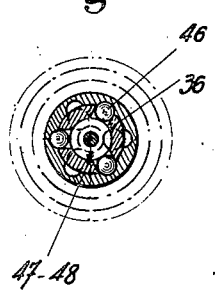

Patented Apr. 25, 1950

2,505,464

UNITED STATES PATENT OFFICE 2,505,464

BICYCLE OR MOTORCYCLE CARRYING A SINGLE STEERING WHEEL AND TRANSMISSION GEARS AND CONNECTIONS THEREFOR

Louis Debuit, Grenoble, France

Application February 1, 1947, Serial No. 725,876
In France November 16, 1943

Section 1, Public Law 690, August 8, 1946
Patent expires November 16, 1963

5 Claims. (Cl. 280—260)

In vehicles with a single steering wheel such as bicycles, motorcycles, tricycles, three-wheeled motorcars, etc. of known type the front wheel, that steers the vehicle, is attached to the machine by means of a fork that can move in relation to the body; this fork is actuated by hand from a control member such as handle bar, and serves to direct the wheel correctly so as to steer the conveyance.

This relative independence, in relation to the machine body, of the part to which the wheel is attached, upsets the general rigidity of the assembly, and on the other hand, the result is that the impacts and jarring to which the steering wheel is exposed, react directly on the arms of the driver.

An object of the invention is a vehicle of the type considered free of the above mentioned troubles and taking the form of a sturdy—although light—compact extremely strong system with easy handling and upkeep.

In line with the invention, the hub of the steering wheel is coupled to an axle supported by the frame of the vehicle forming a rigid arrangement through a universal joint, that serves at the same time for imparting to the wheel its steering movement.

This steering wheel at the same time can be put in motion by the exertion of a driving effort on its axle. This effort can be supplied through a pedal gear the axis of which coincides with that of the axle carrying the wheel. Thus the use of the driving chain is cut out, with its numerous disadvantages, and this is one outstanding feature of the invention.

Bicycles with the pedal on the front wheel have been advocated already. But on such bicycles, the pedals follow all the changes of position of the fork. The result is that with these machines the position of the cyclist is uncomfortable, little adapted for efficient running, and the balance is unsteady. In addition, the effort exerted on the pedals reacts on the handlebar, making it more difficult to manage. With vehicles in accordance with the invention, the pedals are fixed in relation to the frame, and the axis of the pedal gear is always kept at right angles to the axis of the machine, so that the pedaling position remains always the same, that is, the best for the cyclist's comfort, for the execution of the driving effort, and for the general balance. These points are distinctly even more favorable if the cyclist's seat is so arranged that the pedalling is done with the legs definitely inclined obliquely, for instance at 45° from the vertical so that the back of the cyclist takes a large part of the driving effort.

The employment of the front wheel as the driving wheel offers again another adaptation. This consists in making up the machine in two parts, a front and a rear portion, that can be made independent from one another, in such a way that the rear portion can be replaced by a trailer that can be incorporated with the front portion.

The transmission of the driving force to the wheel can be obtained by means of a hollow shaft concentric with the supporting axle that is linked up with the latter and drives the universal joint gear at the speed of the axle or at a speed multiple of this speed. This transmission is carried out for preference by the inclusion of a speed-changing device between the axle and the hollow shaft.

When there is no call to use the speed change, that is for direct drive, the supporting axle is coupled directly with the hollow shaft.

In line with the invention, this direct coupling is provided by means of a link up of two freewheels, one of which serves besides as an agent for connecting the supporting axle with the pinion to which it imparts its driving movement; in this way, particularly, the free-wheel link up is automatically cut out, when the speed change device becomes inoperative, through the fact of the difference of speed that is then set up between the hollow shaft and the supporting axle, while allowing free wheel operation for any of the speed adjustments that can be used.

The speed change device employed can have transmission pinions mounted loose on an axle and engaging pinions fixed rigidly respectively with the hollow shaft and the supporting axle.

In accordance with our invention, in order to secure a transmission pinion rigidly to its axle, cylindrical openings are provided in this axle, which is then hollow, opposite the pinion; these openings are distributed through a cross section of the axle and serve as seatings for balls that project in the inside of the axle and are pushed by means of a piston sliding inside the axle, so as to partly enter grooves cut in the pinion and secure the latter rigidly to the hollow axle. By providing a row of balls for each of the pinions, and giving a suitable outline to the parts of the piston that come into contact respectively with the balls of a corresponding row, successive or simultaneous couplings with the hollow axle of several pinions can be obtained with several pistons, it is possible to produce the simultaneous and successive couplings necessary to get the different desired speeds and to change directly from one to any other speed that can be got through the speed-change device considered.

The attached figures give examples of three manners with no hard and fast limits of carrying out the invention.

Fig. 3 shows a bicycle according to the invention dismantled into its front and rear parts illustrating the manner of keying the rear to the front part.

Fig. 4 shows a substitute trailer as keyed to the front part.

Fig. 5 shows the transmission means in cross-sectional view, as used for the control of the improved bicycle or the like vehicle.

Fig. 6 is a cross-sectional view of the cardan system connecting the steering wheel with its control means.

Figure 1:
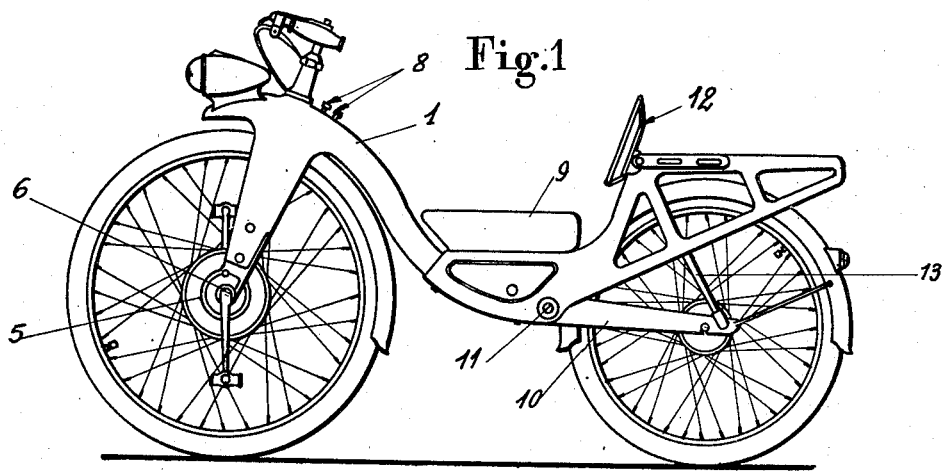
Figs. 1 and 2 show respectively a front and side view of the assembly of a bicycle in accordance with the invention, with pedals arranged on the front wheel.
Figure 2:
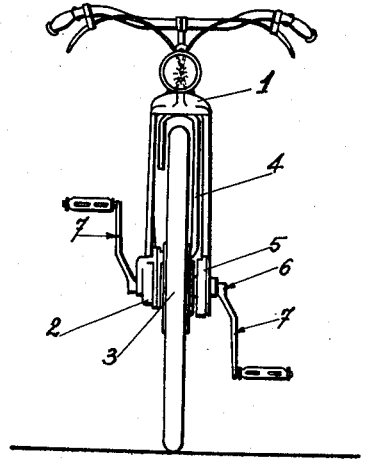

Figs. 7, 8 and 9 relate to the free wheel mechanism incorporated in the vehicle.

Fig. 10 illustrates the control means for the improved change speed mechanism according to the invention.

Fig. 11 illustrates a part view of the mounting of the sleeve about the axle and of the universal joint in the hub of the front-wheel.

In the figures, 1 designates the frame of the bicycle, 2 a speed change box fixed in a protecting case on the right hand side of the bicycle frame and on the axle of the front wheel, the control members for the speed change being rigid with the box; 3 a hub of the wheel that supports the universal joint device and the guiding fork 4; 5 the braking system; 6 the axle to which are fixed the two cranks of the pedal arm 7; at 8 are shown the control knobs for the speed change. The seat 9 is supported by the frame of the bicycle, that is itself attached to the rear wheel (the diameter of which is smaller than that of the front wheel) through a fork 10 screwed to the frame through one of its ends by means of a bolt 11, while its other end is joined to the frame under the back rest 12 of the seat through the shock-absorber 13, so that the axle of the rear wheel can change its position with reference to the frame. In Fig. 3 is shown how the rear part of the bicycle keys into the front portion to which it is attached by means of the screws 14.

On the other hand, as pointed out in Fig. 4, the trailer has a frontal part 15, to which are hinged the arms 16, and which can key into the front part of the bicycle in the place of its rear portion while the arms 16 of the trailer, of any suitable shape, can be made to turn round the axle 17 to form the back rest for the seat, and the arms can be joined by a flexible band 18; the arms are held in a suitable position for their job by a bolt 19. As to the seat itself, it is independent and removable. Fig. 5 is a view of the assembly of the device of our invention through the axle showing the device for steering and driving the wheel by universal joint.

It will be seen from the Figures 5 and 6 that the axle 6, when turned by the pedal cranks 7, drives the hollow shaft 20, that is concentric with this axle, at the same speed or a mutliple of this, as will be explained later. On the hollow axle and fixed slidingly thereto is mounted the universal joint device that drives the wheel and which comprises the inner sleeve 21, the ring 22 and the universal joint link-up formed by the balls 23 and 24 that join up respectively the sleeve to the ring, and the ring to the wheel 25. The wheel on the other hand is steered by means of the fork 4, attached by its upper end to the handle-bar and which acts on the hub of the wheel through a ball-bearing 26.

The brake system employed has a brake-drum 27, that is part of the same sleeve as the core 21 of the universal joint arrangement. In order to make sure of the braking system to brake shoes 28, in the shape of sectors hinged at one end around the spindle 29, are splayed at the other end by the turning on a winged piece 30 around the axis 31, and this turning is controlled by the help of a lever and wire cord; the shoes then press inside the interior of the periphery of the sleeve 21. Thus is obtained a sturdy brake, very strong and sensitive, and protected from dust.

The speed-change device carries the pinions 32, 33, 34 and 35 mounted loose on the hollow axle 36, and the pinions 37, 38, 39 and 40 the respective diameters of which have increasing sizes. The pinions 37 and 38 on the one hand, 39 and 40 on the other, are fixed rigidly to each other; the last pinion is driven from the axle 6 by means of the free wheel mechanism 41 made up by the coaxial notched parts 42 and 43, stamped respectively inside the interior circumference of the pinion and at the periphery of the axle between which lie the rollers or needles 44, as shown in Fig. 7; the pinions 39 and 40 gear respectively with the pinions 33 and 32. On the other hand, the pinions 34 and 35 engage the pinions 37 and 38, these being fixed rigidly together, and besides with the hollow shaft 20 and the assembly of the universal joint device shown in Fig. 8. The gearings 39—40 and 37—38 are connected with each other by means of the free wheel mechanism 45 of the same type as the preceding one, placed between the pinions 39 and 38, which latter is rigid with the shaft 20 as shown in Fig. 8; thus is obtained automatically a direct driving of the hollow shaft 20 by the axle 6 when the transmission pinions are left loose on their axle and when consequently the effect of the free-wheel does not interfere.

The coupling between the hollow shaft and the transmission pinions is done, with the balls 46 distributed in their seats at the periphery of the hollow axle, in front of each pinion in rows of three, as shown in Fig. 9, by a change of position of the pistons 47 and 49, each showing a restricted part 49 and an expansion 50, both with sloping portions. Under the effect of the push exerted by the sloping portions of one of the pistons, the balls of a row cooperating with this piston and located in front of it in the direction of its displacement, slide along this sloping portion and enter in the grooves or notches of a corresponding pinion where they are held by the cylindrical wall of the piston, while the said restricted part and expansion are placed in relation to the corresponding grooves in a manner such that the balls that correspond to them do not enter their grooves simultaneously, some falling into the restricted part before the others engage their grooves. Thus each piston can operate during one same movement, both the coupling of one transmission pinion with the hollow axle and the freeing of another from said axle.

The combined movements of the two pistons allow the functioning of all the speed-changes available. The second speed, the first being that corresponding to direct speed, is got by pushing the two pistons home, which secures the pinions 33 and 34 rigidly to the hollow axle; the movement of the axle 6 is thus transmitted successively to the pinions 40 and 39 through the free-wheel 41, then to the pinions 33, 34, 38; the latter drives the wheel 25 through the sleeve 20 and the universal joint system. The third speed is got by making pinions 32 and 34 rigid with one another, the fourth the pinions 33 and 35 rigid with one another and the fifth the pinions 32 and 35; it will thus be seen that a correct handling of the two pistons will enable the driver to go directly from one to the other of the above speeds.

The control arrangement of the movement of the piston is shown in Fig. 10. It carries for each of the pistons a bell crank lever 51 swinging on an axis 52 and the end of which remote from the piston is joined to a triangle 53 fixed rigidly to a knob 8; on pulling or pushing on one of the knobs and consequently the triangle belonging to it, with reference to an intermediary position, one of the pistons approaches or separates from the other. By working the two knobs in both directions, the driver can get all the combinations of each of the two pinions on the left with each of the pinions on the right, as required for securing the four speeds obtained by means of the transmission pinions.

Fig. 11 illustrates the position of the pistons 47 and 48 corresponding to direct drive, none of the transmission pinions being coupled with the hollow axle; the two knobs then assume the intermediary positions above mentioned. It is sufficient moreover for one only of the knobs to be in this position to ensure that the speed change is inoperative, since only one of the transmission pinions is then coupled with the axle 36.

It is worthy of note that the free-wheel 41 is operative in providing all the speeds mentioned, while the effect of the free-wheel 45 is used only for the direct drive; the link up of two free-wheels between the hollow shaft 20 and the supporting axle 6, of which mention has been made with reference to the direct drive is made by the free-wheels 45 and 41, this latter taking also part in the engaging of the transmission pinions 32 and 33.

It should be understood that the scope of the invention is not limited to the application considered, it covers the systems cooperating in its execution and especially the transmission gear and connections considered per se in their other possible applications.

What I claim is:

1. In a vehicle of the bicycle type with a steerable front-wheel drive, a cycle frame, a rigid supporting fork, the plane of which contains the pivotal axis of the front-wheel, said fork being integral with said frame, bearings carried by said fork, a horizontal axle rotatably mounted in said bearings, pedals to drive said axle, a steering member capable of pivoting about the axis of said fork, a wheel mounted in said fork, a hub for that wheel connected directly through a bearing with said steering member to make said wheel steerable, said horizontal axle projecting through said hub, and a universal joint being interposed between said hub and said axle.

2. In a vehicle of the bicycle type with a steerable front-wheel drive, a cycle frame, a rigid supporting fork the plane of which contains the pivotal axis of the front-wheel, said fork being integral with said frame, bearings carried by said fork, a horizontal axle rotatably mounted in said bearings, pedals to drive said axle, a sleeve arranged about said horizontal axle, a steering member capable of pivoting about the axis of said fork, a wheel mounted in said fork, a hub for that wheel connected directly through a bearing with said steering member, to make said wheel steerable, a sleeve rotatably mounted about said axle and projecting through said hub, a universal joint interposed between said hub and said sleeve, and a change-speed gear mechanism interposed between said sleeve and said horizontal axle.

3. In a vehicle of the bicycle type with a steerable front-wheel, a frame, a fork rigid with said frame, bearings carried by said fork, a horizontal axle rotatably mounted in said bearings, means to drive said axle, a steering member capable of pivoting about the axis of the fork, a steering wheel mounted in said fork, a hub for said wheel connected frictionless with said steering member, a sleeve arranged about said horizontal axle and projecting through said hub, a ring arranged with play about said sleeve and connected therewith through the medium of a first universal joint element, a second universal joint element connecting the ring with the wheel hub, a staged pinion change-speed gear mechanism and a unidirectional coupling interposed between said sleeve and said horizontal axle, a secondary coupling comprising an additional unidirectional coupling connected with the first one for the direct coupling of the sleeve with the axle.

4. In a vehicle of the bicycle type with a steerable front-wheel, a frame, a fork rigid with said frame, bearings carried by said fork, a horizontal axle rotatably mounted in said bearings, means to drive said axle, a steering member capable of pivoting about the axis of the fork, a steering wheel mounted in said fork, a hub for said wheel connected frictionless with said steering member, a sleeve arranged about said horizontal axle and projecting through said hub, a universal joint interposed between said hub and said sleeve, a change-speed mechanism with permanently meshed staged gear wheels and a unidirectional coupling interposed between said sleeve and said horizontal axle, said mechanism comprising two gear wheel sets, one of which is keyed on said sleeve, and the transmission gear wheels in the other set being mounted for free motion on a secondary shaft, a shiftable keying system to couple said transmission gear wheels individually, a secondary connection comprising an additional unidirectional coupling connected with the first one for the direct coupling of the sleeve with the axle.

5. In a vehicle of the bicycle type with a steerable front-wheel, a frame, a fork rigid with said frame, bearings carried by said fork, a horizontal axle rotatably mounted in said bearings, means to drive said axle, a steering member capable of pivoting about the axis of the fork, a steering wheel mounted in said fork, a hub for said wheel connected frictionless with said steering member, a sleeve arranged about said horizontal axle and projecting through said hub, a universal joint interposed between said hub and said sleeve, a change-speed mechanism with permanently meshed staged gear wheels and a unidirectional coupling interposed between said sleeve and said horizontal axle, said mechanism comprising two gear wheel sets one of which is keyed on said sleeve and the transmission gear wheels in the other set being mounted for free motion on a hollow secondary shaft, at least one piston slidably received in said hollow shaft to provide, depending on its position and with the aid of the aforementioned parts, for the individual engagement of the said transmission gear wheels, a secondary connection comprising an additional unidirectional coupling connected with the first one for the direct coupling of the sleeve with the axle.

LOUIS DEBUIT.

REFERENCES CITED

The following references are of record in the file of this patent:

UNITED STATES PATENTS

| Number | Name | Date |
|---|---|---|
| 397,976 | Doan | Feb. 19, 1889 |
| 1,184,321 | Chapin | May 23, 1916 |
| 1,421,545 | Osborn | July 4, 1922 |
| 1,498,876 | Ingoldby | June 24, 1924 |
| 1,506,565 | Clatworthy | Aug. 26, 1924 |